US012106914B2

(12) United States Patent
Grieshaber et al.

(10) Patent No.: US 12,106,914 B2
(45) Date of Patent: Oct. 1, 2024

(54) INDUCTION-CONTROLLED SWITCH HAVING A VACUUM BULB FOR REDUCING VIBRATIONS

(71) Applicant: Supergrid Institute, Villeurbanne (FR)

(72) Inventors: Wolfgang Grieshaber, Lyons (FR); Florent Robert, Lyons (FR)

(73) Assignee: Supergrid Institute, Villeurbanne (FR)

( * ) Notice: Subject to any disclaimer, the term of this patent is extended or adjusted under 35 U.S.C. 154(b) by 171 days.

(21) Appl. No.: 17/925,663

(22) PCT Filed: May 25, 2021

(86) PCT No.: PCT/EP2021/063925

§ 371 (c)(1),
(2) Date: Nov. 16, 2022

(87) PCT Pub. No.: WO2021/239739

PCT Pub. Date: Dec. 2, 2021

(65) Prior Publication Data

US 2023/0197378 A1 Jun. 22, 2023

(30) Foreign Application Priority Data

May 26, 2020 (FR) ...................................... 2005552

(51) Int. Cl.
*H01H 33/666* (2006.01)
*H01H 33/662* (2006.01)
*H01H 33/664* (2006.01)

(52) U.S. Cl.
CPC ........ *H01H 33/666* (2013.01); *H01H 33/662* (2013.01); *H01H 33/664* (2013.01)

(58) Field of Classification Search
CPC .. H01H 33/666; H01H 33/662; H01H 33/664; H01H 33/6662; H01H 33/285; H01H 50/30; H01F 7/08; H01F 7/123; H01F 7/0231
USPC ...... 218/118, 123, 126, 129, 130, 28, 47, 48
See application file for complete search history.

(56) References Cited

U.S. PATENT DOCUMENTS

| | | | | |
|---|---|---|---|---|
| 9,570,263 B2 * | 2/2017 | Parashar | ................. | H01J 17/44 |
| 9,576,714 B2 * | 2/2017 | Cheng | .................... | H01H 50/42 |
| 10,325,737 B2 * | 6/2019 | Woo | ........................ | H01H 33/28 |
| 10,580,599 B1 * | 3/2020 | Wang | .................... | H01F 7/0231 |
| 2018/0005784 A1 | 1/2018 | Nagatake et al. | | |

FOREIGN PATENT DOCUMENTS

| | | |
|---|---|---|
| DE | 202011050847 | 11/2011 |
| WO | 2008139250 A1 | 11/2008 |

* cited by examiner

*Primary Examiner* — William A Bolton
(74) *Attorney, Agent, or Firm* — GableGotwals

(57) ABSTRACT

An induction-controlled switch having a vacuum bulb comprising a vacuum chamber and a switch comprising first and second electrodes. The first switch comprising first and second electrodes and further having a first actuator slidably mounted in a first direction and rigidly attached to the first electrode. The first actuator comprising a first armature. A second actuator comprising a second armature. A first control member comprising a first coil configured to simultaneously generate a switching current in the first armature and a current in the second armature via the first coil, so as to separate or bring into contact the first and second electrodes and so as to move the first and second actuators in opposite ways along the first direction.

15 Claims, 11 Drawing Sheets

INDUCTION-CONTROLLED SWITCH HAVING A VACUUM BULB FOR REDUCING VIBRATIONS

CROSS-REFERENCE TO RELATED APPLICATIONS

This United States application is the National Phase of PCT Application No. PCT/EP2021/063925 filed 25 May 2021, which claims priority to French Patent Application No. 2005552 filed 26 May 2020, each of which is incorporated herein by reference.

BACKGROUND OF THE INVENTION

The invention relates to electrical protection devices such as contactors, circuit breakers, switches and high-voltage quick disconnects, and in particular to vacuum bulbs used on high-voltage networks for such switches. The use of vacuum bulbs allows high voltages to be maintained whilst having low contact resistance in the closed state.

Document JPH0992100 describes a high-voltage DC vacuum bulb.

Document JPH08222092 describes a vacuum bulb actuated by electromagnetic repulsion.

A vacuum bulb typically has a fixed and a mobile electrode, with contact between the electrodes taking place within a chamber with vacuum sealing. For a circuit breaker, the movement of the mobile electrode is made possible by the use of a circuit breaker drive comprising an opening coil, a closing coil and a mobile plate placed between these coils. The mobile electrode is connected to the mobile plate by a generally insulating rod.

To operate the circuit breaker, a capacitive assembly is discharged into the corresponding coil. The current peak that runs through the coil then generates an electromagnetic pulse that generates eddy currents, known as Foucault's currents, in the mobile plate, whose electromagnetic field opposes that of the coil. The mobile plate is then said to be "induced". This creates a repulsive force between the energised coil and the armature, allowing the mobile plate and the connected mobile electrode to move.

The reaction force on the opening coil and its support induces harmful vibrations during the opening. When in use, the reaction force on the opening coil and its support may deform or displace them in the frame reference of the supporting frame. As a result, the air gap between the opening coil and the armature surface can become uneven on the armature surface. In particular, the air gap can increase during the lifetime of the circuit breaker. And, since a small air gap optimises the efficiency of the electromechanical conversion, the opening of the circuit breaker may become increasingly slower over time. In addition, in order to increase the breaking capacity, it is necessary to increase the stroke of the mobile plate as well as the force exerted to perform the opening.

Furthermore, a similar problem is encountered when implementing the closing of a contactor.

The invention aims to overcome one or more of these drawbacks. The invention thus relates to a vacuum bulb switch with inductive control as defined in the appended claims.

The invention also relates to variants of the dependent claims. A person skilled in the art will appreciate that each of the features of the dependent claims and the description can be combined independently with the above features, without constituting an intermediate generalisation.

DETAILED DESCRIPTION OF THE DRAWINGS

Further features and advantages of the invention will be clear from the following description, which is indicative and not restrictive, with reference to the attached drawings, in which.

DESCRIPTION OF THE INVENTION

The invention applies to an electrical safety switch, the main function of which is either disconnection, for example for a circuit breaker, or connection, for example for an earthing device.

Figure 1:
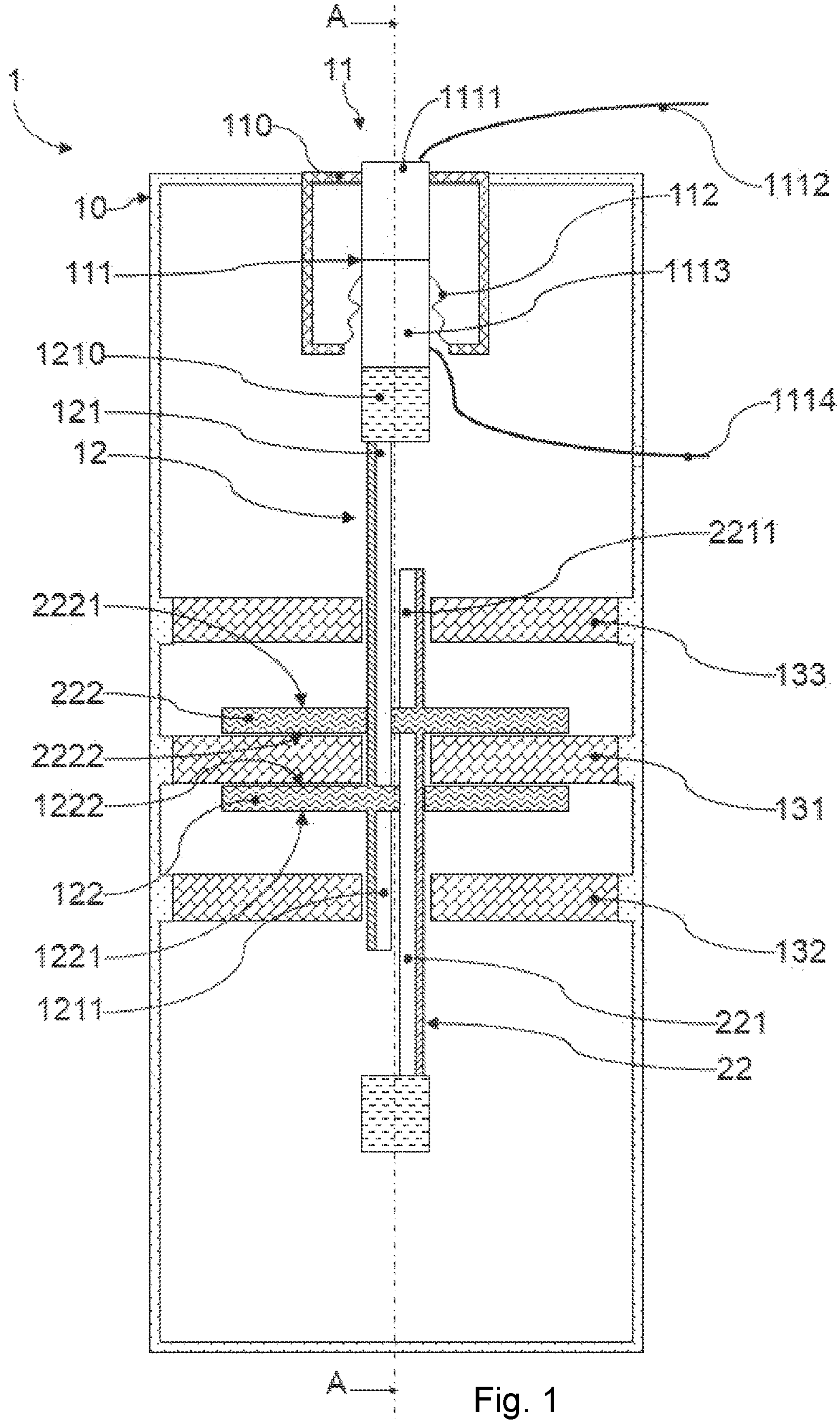
FIG. 1 shows a side sectional view of a vacuum-interrupter circuit breaker with inductive control, in the closed position, with an induced two-plate switch, according to an example of implementation of the invention.

FIG. 1 shows a side sectional view of an example of a vacuum-interrupter circuit breaker with inductive control 1 according to the invention, in the closed position, having a frame 10 to which a vacuum bulb 11 is attached.

The vacuum bulb 11 has:

- a chamber 110 with vacuum sealing,
- a switch 111 having a fixed electrode 1111 and a mobile electrode 1113. The electrodes 1111 and 1113 are aligned along an A axis. The electrodes 1111 and 1113 are housed in the vacuum chamber 110;
- a bellows 112 allowing a translational movement of the mobile electrode 1113 along the A axis. The electrodes 1111 and 1113 can thus be brought into contact with each other (to close the switch) or separated from each other (to open the switch) while maintaining the vacuum sealing of the chamber 110.

The line current is supplied and removed by electrical connections 1112 and 1114 connected to electrodes 1111 and 1113 respectively.

The circuit breaker 1 comprises an actuator 12 which is integral with the mobile electrode 1113. The actuator 12 allows the mobile electrode 1113 to be operated to open or close the switch 111 of the circuit breaker 1. The actuator 12 is slidably mounted in the vertical orientation parallel to the A axis. The actuator 12 comprises an armature 122.

The circuit breaker 1 also comprises:

- an opening control-element. The opening control-element has a coil 131;
- a further actuator 22 slidably mounted in the vertical orientation parallel to the A axis. The actuator 22 comprises an armature 222. The coil 131 is positioned between the armature 122 and the armature 222.

The opening control-element is configured to simultaneously induce an opening current in the armature 122 and a current in the armature 222, so as to separate the electrodes 1111 and 1113 and so as to move the actuators 12 and 22 in opposite directions along the vertical orientation parallel to the A axis. To minimise the stresses on the frame created by the reaction forces, the two axes along which the movements of the actuators 12 and 22 take place are merged. The control-element thus makes it possible to open the circuit breaker 1 in a reduced time and to compensate for the reaction forces of the armature 122 on the coil 131 by the reaction forces of the armature 222 on the coil 131, as will be explained in detail below. Thus, compressive forces of the same magnitude are only applied to this coil 131, which reduces the size of its attachment to the frame 10. As a result of the compensation of these forces, the coil 131 undergoes less deformation and the air gap between this coil 131 and the armature 122 varies little over the lifetime of the circuit breaker 1. In this way, a fast opening time of the circuit breaker 1 can be guaranteed, even after a large number of opening and closing operations. The vibrations generated when circuit breaker 1 is opened are also reduced.

Advantageously, the mobile mass integral with the actuator 22 is at least equal to half the mobile mass integral with the actuator 12, preferably equal to the mass of this actuator 12, in order to obtain optimal compensation of the reaction forces on the coil 131. The mobile mass integral with an actuator includes its mass and that of its mobile electrode.

The actuator 12 here has a rod 121. The rod 121 may have a dielectric material element 1210 to eliminate any risk of arcing between a control zone of the circuit breaker 1 and the mobile electrode 1113. The rod 121 also has one or more arms 1211, advantageously made of conductive material. The element 1210 is interposed between the arm 1211 and the electrode 1113. The armature 122 is integral with the arm 1211. The dielectric element 1210 of the rod 121 is advantageously tubular in shape.

The armature 122 advantageously takes the form of a plate located between a planar coil 132 and the (here also planar) coil 131. The planar coil 132 belongs to a closing control-element of the circuit breaker 1. The planar coil 132 is the closing coil. The coil 132 is therefore positioned opposite the armature 122 of the actuator 12, on the opposite side to the armature 222.

The armature 122 here has a lower conducting surface 1221 facing the coil 132 and an upper conducting surface 1222 facing the coil 131. The surfaces 1221 and 1222 may be formed in one piece in a solid plate or may be mounted on a plate-like support of a different material. The surfaces 1221 and 1222 are perpendicular to the A axis. Advantageously, the surfaces 1221 and 1222 are metallic. The material of the armature 122 may be selected for its high conductivity to density ratio; the armature material 122 may thus advantageously be aluminium. Advantageously, the arm(s) 1211 are coated with the same metallic material as the surfaces 1221 and 1222 or are formed from the same metallic material as the surfaces 1221 and 1222. A metal part of the arms 1211 is thus encircled by the coil 131, in order to promote centering of the actuator 12. Advantageously, the armature surfaces 1221 and 1222 (as well as the coil 131) are axisymmetrical with respect to the A axis, so that force torques are compensated on the different elements of the armature 122.

A planar coil 133 is placed opposite the coil 132 symmetrically with respect to the coil 131.

The coils 131, 132 and 133 are attached to the frame 10 and are traversed in the vertical orientation parallel to the A axis by the rod 121 of the actuator 12.

The actuator 22 also passes through the coils 131, 132 and 133 in the vertical orientation parallel to the A axis.

The actuator 22 also has a rod 221, advantageously tubular in shape, symmetrical to the rod 121 in the vertical orientation parallel to the A axis. The rod 221 also has one or more arms 2211, passing through the coils 131, 132 and 133 and the armature 122 in the vertical orientation.

The armature 222 here has an upper conducting surface 2221 facing the coil 133 and a lower conducting surface 2222 facing the coil 131. The surfaces 2221 and 2222 may be formed in one piece in a solid plate or may be mounted on a support. The surfaces 2221 and 2222 are perpendicular to the A axis. The surfaces 2221 and 2222 are metallic. The material of the armature 222 may be selected for its high conductivity to density ratio; the armature material 222 may thus advantageously be aluminium. The arm(s) 2211 are advantageously covered with the same metallic material as the surfaces 2221 and 2222. A metal part of the arms 2211 is thus encircled by the coil 131, in order to promote centering of the actuator 22. The armature 222 is integral with the arm 2211.

The actuator 12 passes through the armature 222 between the coils 131 and 133. The actuator 22 passes through the armature 122 between the coils 131 and 132. Advantageously, the actuators 12 and 22 have strictly similar tubular shapes. The actuators 12 and 22 are also advantageously made of the same material.

This configuration allows the actuators 12 and 22 to guide each other in sliding in the orientation parallel to the A axis perpendicular to the surfaces 1221, 1222, 2221 and 2222.

Figure 2:
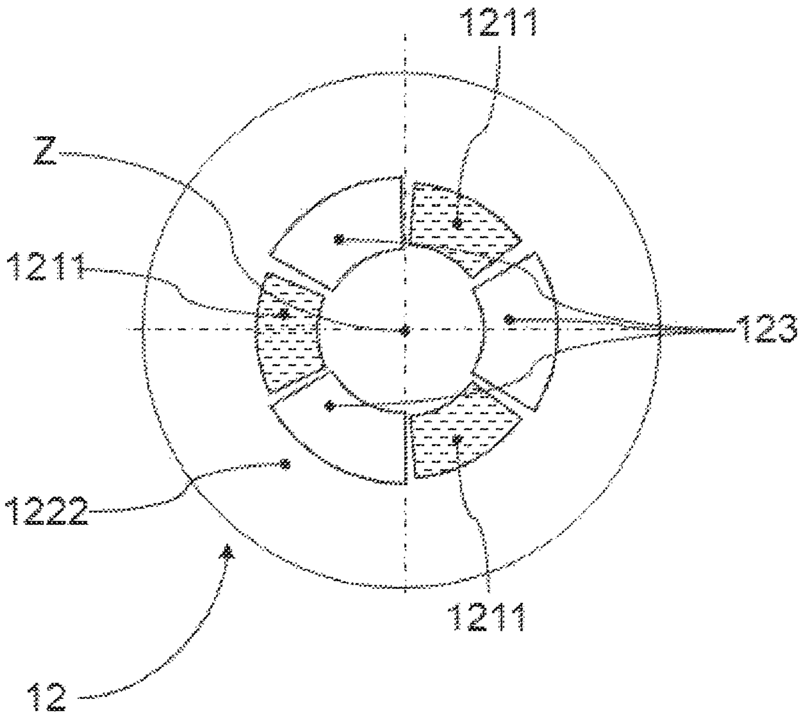
FIG. 2 shows a top sectional view of an actuator of the circuit breaker of FIG. 1, in section at a shaft.

FIG. 2 shows a top section view of the actuator 12. The surface 1222 of the armature plate 122 of the circuit breaker 1 according to an example of an embodiment of the invention can be seen.

The armature 122 is advantageously disc-shaped.

The rod 121 advantageously has three arms 1211 extending in the orientation parallel to the A axis perpendicularly to the surface 1222 and to the surface 1221 (not visible in FIG. 2) and distributed symmetrically about the centre Z (coincident with the A axis) of the armature 122.

The armature 122 is pierced with orifices 123, in which the arms 2211 of the rod 221 of the actuator 22 (not shown) slide. There are advantageously as many orifices 123 as there are arms 1211 of the rod 121 and the former are symmetrically distributed around the centre Z of the armature 122.

Figure 3:
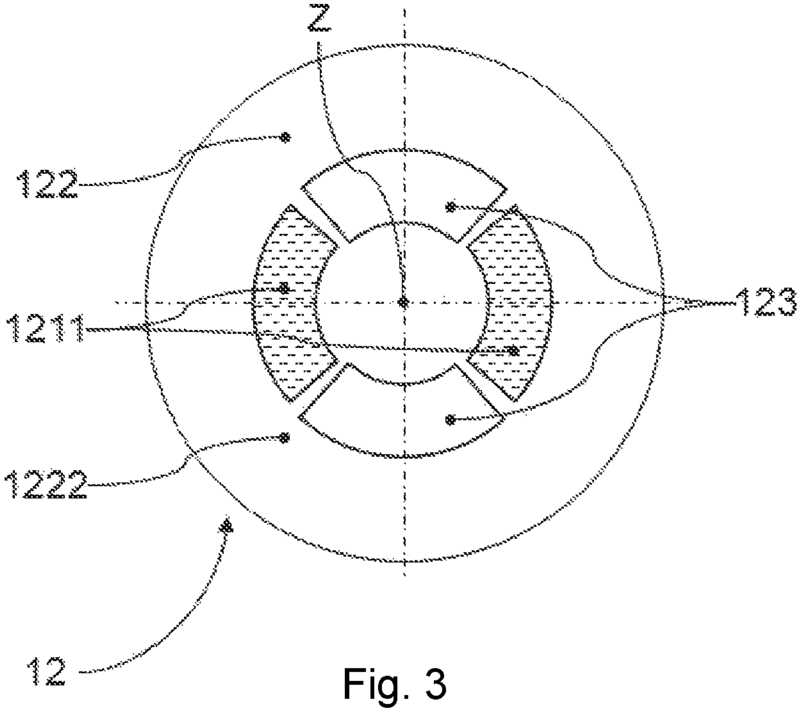
FIG. 3 shows a top sectional view of a variant of the actuator of the circuit breaker of FIG. 1.

FIG. 3 shows a top section view of the actuator 12. The surface 1222 of the armature plate 122 of the circuit breaker 1, according to an example of an embodiment of the invention with two arms 1211 and two orifices 123, can be seen.

Figure 4:
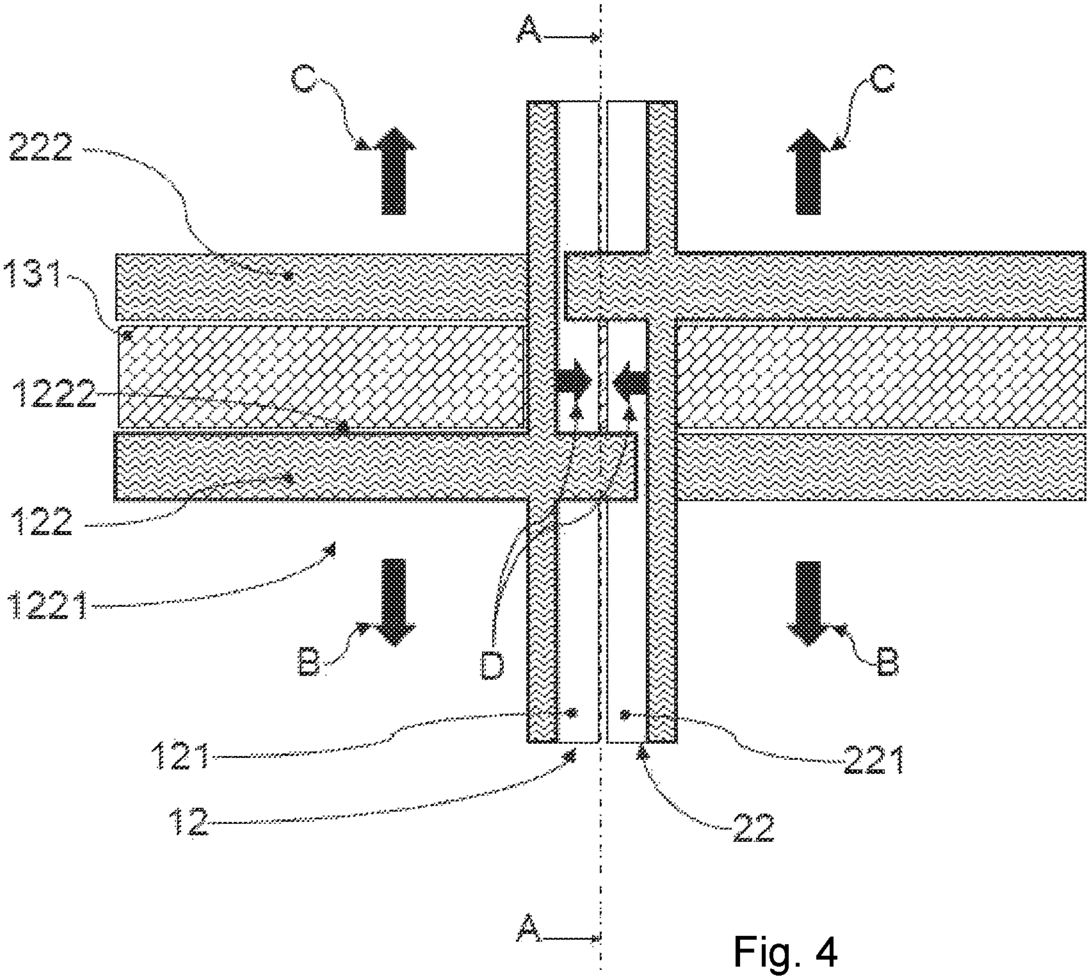
FIG. 4 shows a detailed side sectional view of the control-element of the circuit breaker of FIG. 1.

FIG. 4 shows a detailed side sectional view of the opening control-element of the circuit breaker 1.

According to an example of an embodiment of the invention, the coil 131 is connected to a capacitor or capacitive assembly (not shown) configured to generate an opening current in the coil 131. The opening-current peak thus flows through the coil 131 which then generates an electromagnetic pulse which generates induced eddy currents in the armature 122 and in the armature 222 whose electromagnetic field opposes that of the coil 131. Mechanical repulsive forces B, C and D then occur between the energised coil 131 and the armatures 122 and 222.

Forces B and C occur in orientations perpendicular to surfaces 1221 and 1222 respectively. Forces B and C are used to give the actuator 12 sufficient acceleration in the orientation parallel to the A axis to move the actuator 12 in that orientation, in an opening direction. In a similar fashion, the actuator 22 is simultaneously moved in an opposite direction to the actuator 12.

When the arms 1211 and 2211 are made of conductive material, the force D appears in an orientation perpendicular to the A axis. The force D is used to generate a magnetic centering of the actuator 12 and the actuator 22 with respect to the A axis.

Figure 5:
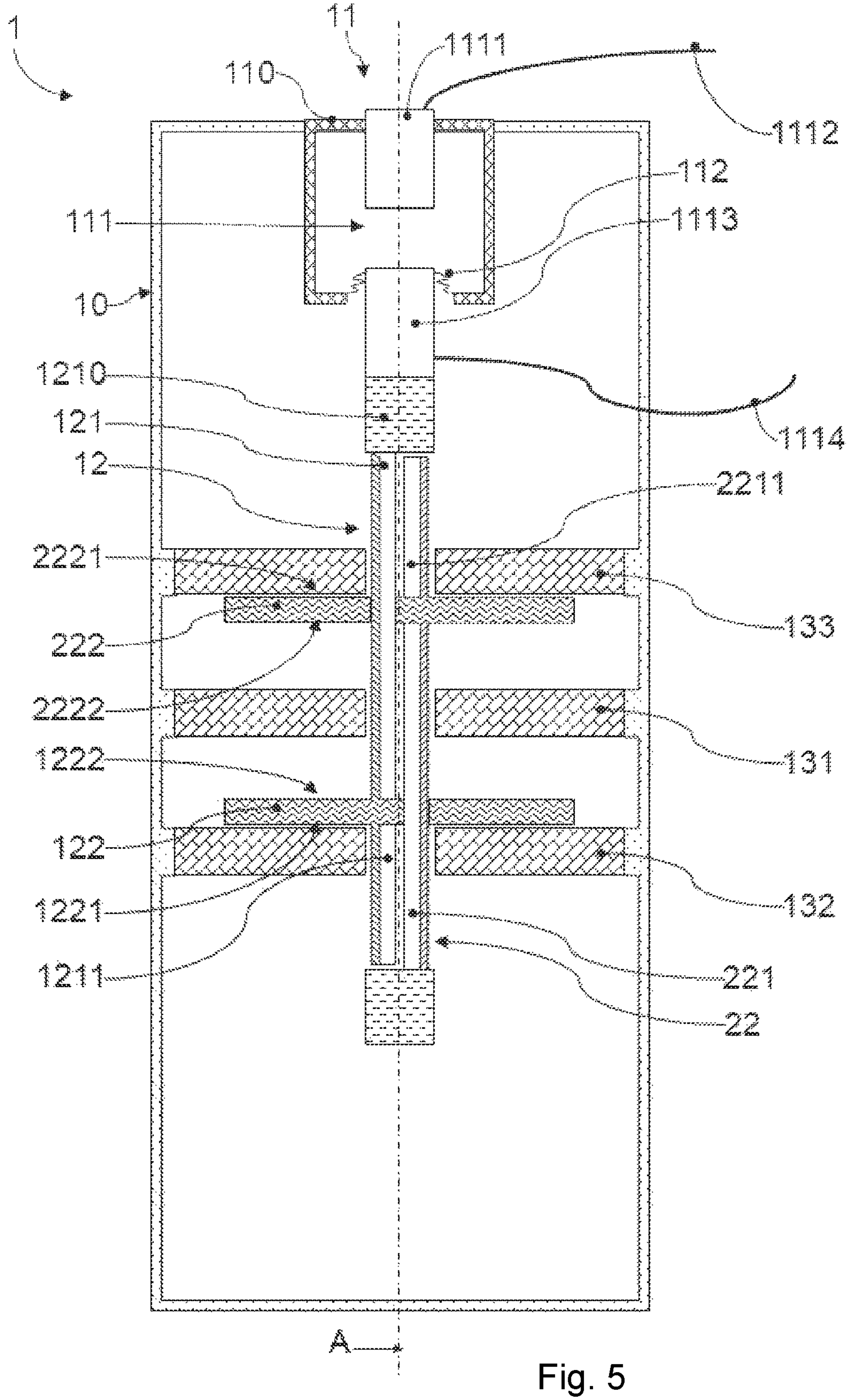
FIG. 5 shows a side sectional view of the circuit breaker in the open position.

FIG. 5 shows a side cross-sectional view of the vacuum-interrupter circuit breaker with inductive control 1 in the open position, achieved by generating an opening current in the coil 131 as detailed above.

In an example of an embodiment of the invention, the coils 132 and 133 are connected to a capacitor or capacitive assembly (not shown) configured to generate a closing current in the coils 132 and 133. The closing-current peak thus flows through the coils 132 and 133, which then generate an electromagnetic pulse that generates induced eddy currents in the armature 122 and in the armature 222 respectively, whose electromagnetic field opposes that of the coils 132 and 133 respectively.

Mechanical repulsive forces then occur between the coil 132 and the armature 122, in an orientation perpendicular to the surface 1221. These forces allow the actuator 12 to be accelerated sufficiently in the orientation parallel to the A axis to move the actuator 12 in that orientation, in a direction to close the switch 111.

In a similar operation, equivalent mechanical forces also occur between the coil 133 and the armature 222 in an orientation perpendicular to the surface 2221. These forces allow the actuator 22 to be accelerated sufficiently in the orientation parallel to the A axis to move the actuator 22 in that orientation, in a direction opposite to that of the actuator 12.

Figure 6:
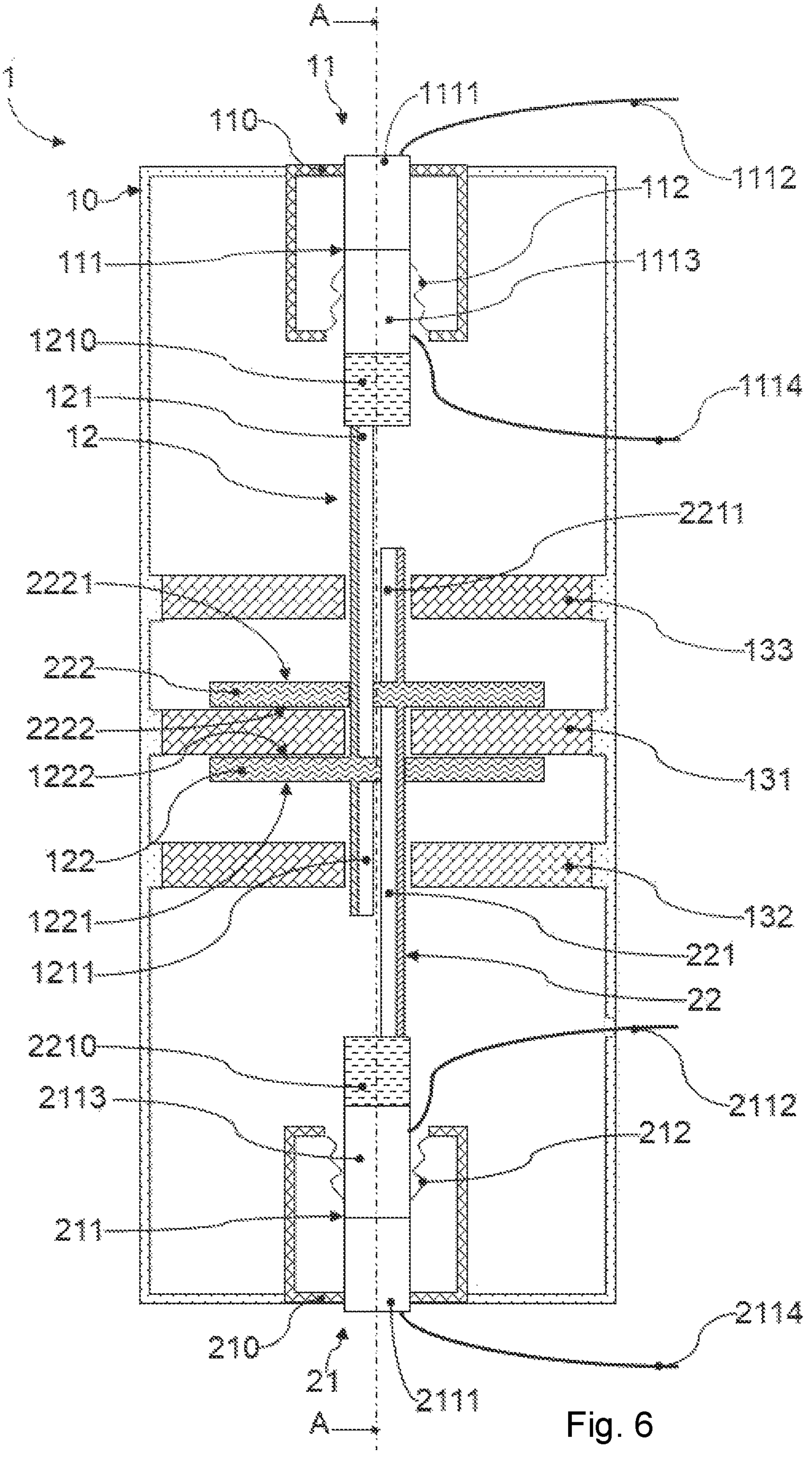
FIG. 6 shows a side sectional view of a variant of the circuit breaker, in the closed position, having two switches and two induced plates, according to another example of implementation of the invention.

FIG. 6 shows a side sectional view of the vacuum-interrupter circuit breaker with inductive control 1 in the closed position, according to an alternative embodiment of the invention comprising the frame 10 to which two vacuum bulbs 11 and 21 are attached. The vacuum bulb 11, the actuator 12, the armatures 122 and 222, and the control coils 131 to 133 are identical to those of the previous embodiment.

The vacuum bulb 21 has:

- a chamber 210 with vacuum sealing,
- a switch 211 having a fixed electrode 2111 and a mobile electrode 2113. The electrodes 2111 and 2113 are aligned along an A axis. The electrodes 2111 and 2113 are housed in the vacuum chamber 210;
- a bellows 212 allowing a translational movement of the mobile electrode 2113 along the A axis. The electrodes 2111 and 2113 can thus be brought into contact with each other or separated from each other while maintaining the vacuum sealing of the chamber 210.

The line current is supplied and removed by electrical connections 2112 and 2114 connected to electrodes 2113 and 2111 respectively.

The mobile electrode 2113 is made integral with a member 2210 of the actuator rod 221 of the actuator 22. The element 2210 is made of a dielectric material in order to eliminate any risk of arcing between a control zone of the circuit breaker 1 and the mobile electrode 2113. The dielectric element 2210 is advantageously tubular in shape.

According to this example of an embodiment of the invention, just the generation of an opening current in the coil 131 suffices to give the actuators 12 and 22 sufficient acceleration to open both the switch 111 and the switch 211, while preserving the balance of the forces exerted on the coil 131. If the actuators 12 and 22 are identical and the switches 111 and 211 are identical, the forces on the coil 131 are perfectly balanced. The forces of gravity may be considered negligible compared to the forces exerted on the actuators 12 and 22 by the coil 131 during opening.

According to an alternative embodiment of the invention, the switches 111 and 211 may be electrically connected in series, thereby increasing the breaking capacity of the opening control of the circuit thus formed. Such a double cut-off can also be achieved in a relatively small space, with the switches 111 and 211 fixed to the same body and the actuators 12 and 22 nested.

According to another embodiment of the invention, the switches 111 and 211 may each be connected to an independent current circuit or to two circuits connected in parallel, thereby enabling simultaneous opening of these two current circuits.

A parallel connection allows the double current to be conducted in the closed state, thus avoiding excessive heating.

When the switches 111 and 211 are connected in series or parallel, it is advantageous to connect their mobile electrodes 1113 and 2113 together, so that the thickness of the dielectric elements 1210 and 2210 can be minimised or eliminated.

Figure 7:
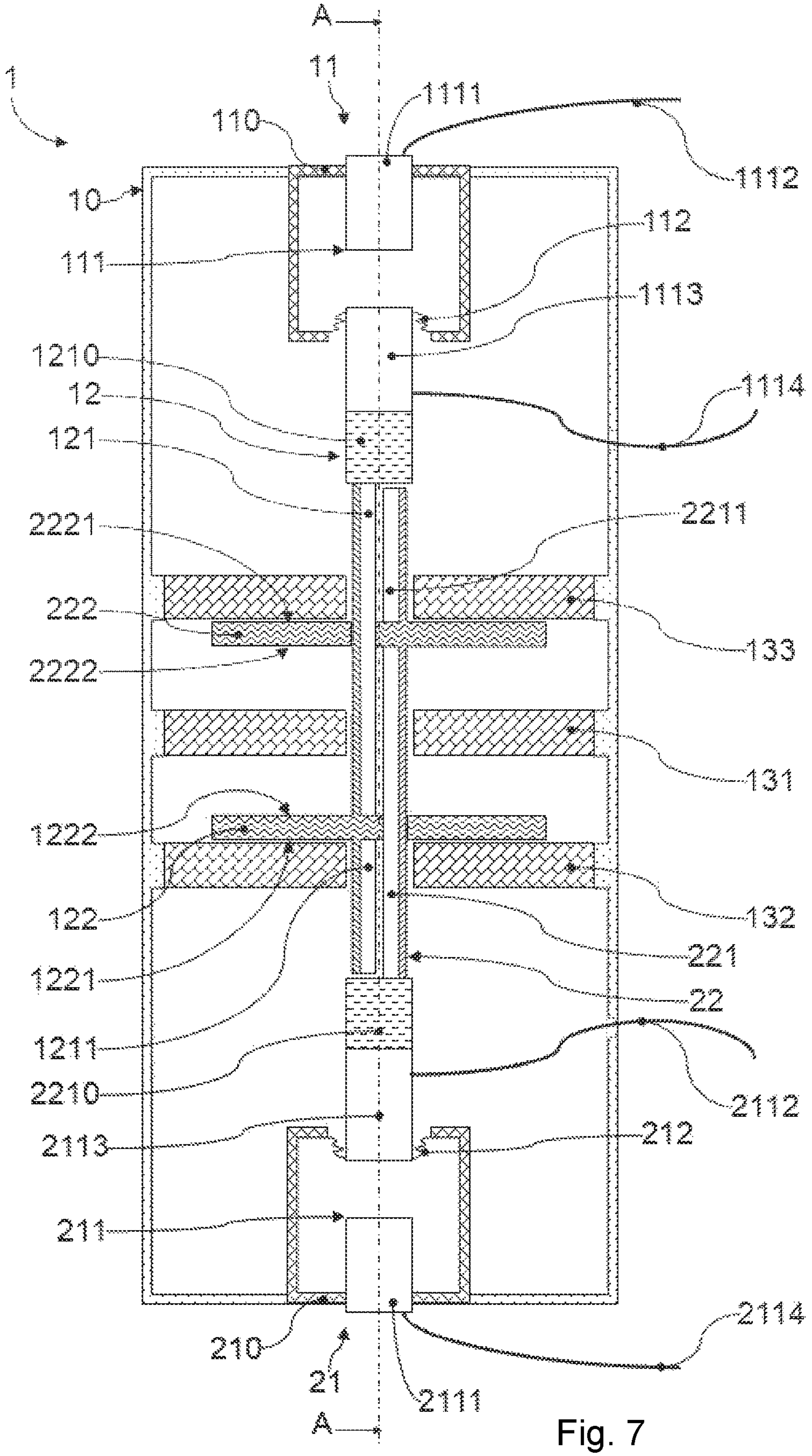
FIG. 7 shows a side sectional view of the variant of the circuit breaker of FIG. 6 in the open position.

FIG. 7 shows a side cross-sectional view of the vacuum-interrupter circuit breaker with inductive control 1, according to the variant described in FIG. 6, in the open position, achieved by generating an opening current in the coil 131 as detailed above.

In an example of an embodiment of the invention, the coils 132 and 133 are connected to a capacitor or capacitive assembly (not shown) configured to generate a closing current in the coils 132 and 133. As in the previous embodiment, mechanical repulsive forces then occur between the coil 132 and the armature 122, in an orientation perpendicular to the surface 1221. These forces allow the actuator 12 to be accelerated sufficiently in the orientation parallel to the A axis to move the actuator 12 in that orientation, in a direction to close the switch 111.

In a similar operation, equivalent mechanical forces also occur between the coil 133 and the armature 222 in an orientation perpendicular to the surface 2221. These forces allow the actuator 22 to be accelerated sufficiently in the orientation parallel to the A axis to move the actuator 22 in that orientation, in a direction to close the switch 211, which direction is opposite to that of the actuator 12.

Figure 8:
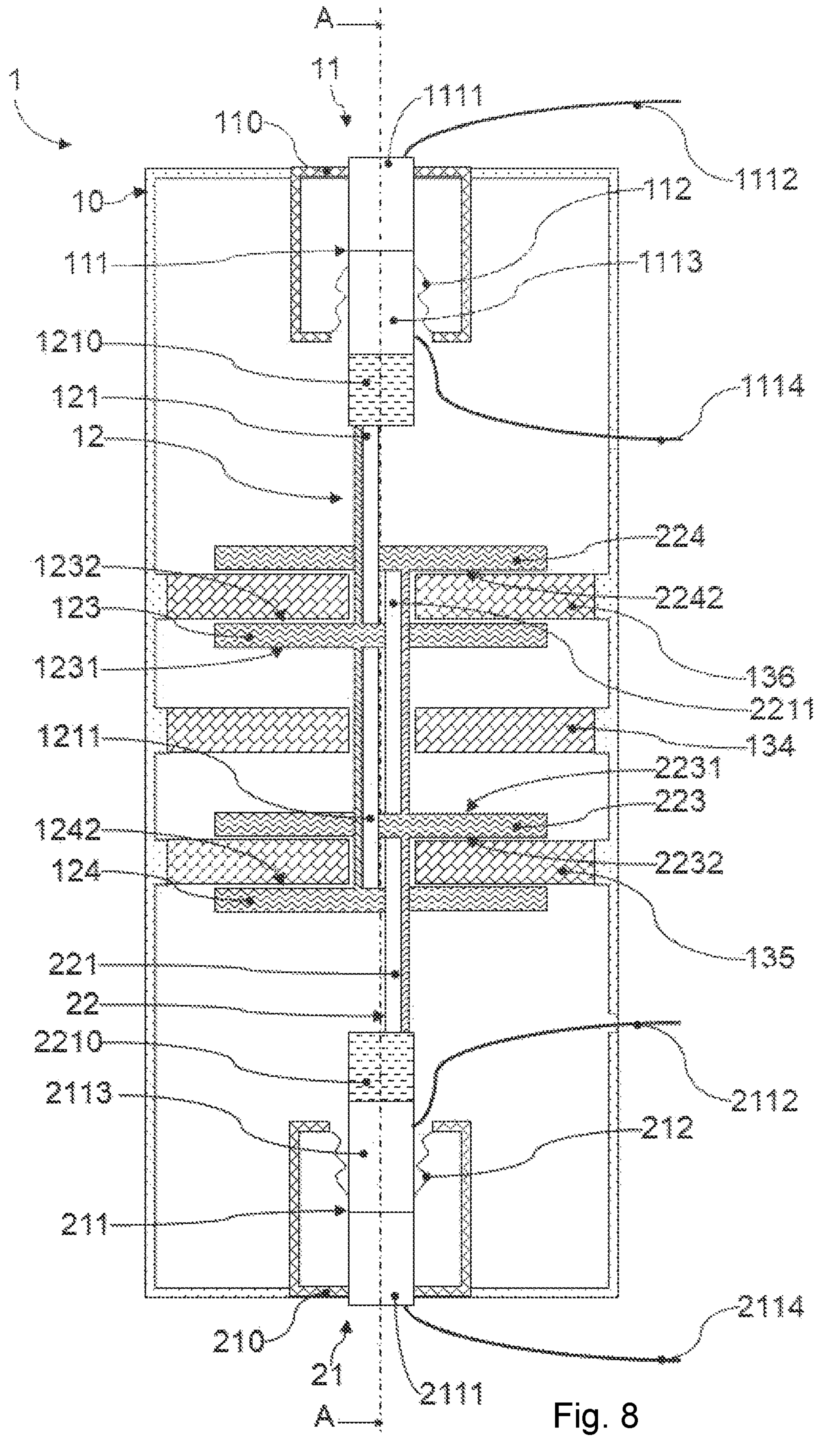
FIG. 8 shows a side sectional view of another variant of the circuit breaker, in the closed position, having two switches and four induced plates, according to another example of implementation of the invention.

FIG. 8 shows a side sectional view of the vacuum-interrupter circuit breaker with inductive control 1 in the closed position, according to an alternative embodiment of the invention comprising the frame 10 to which two vacuum bulbs 11 and 21 are attached.

The circuit breaker 1 comprises here:

- an opening control-element, itself comprising two coils 135 and 136;
- a closing control-element, itself comprising a coil 134, the actuator 12, itself comprising two armatures 123 and 124, the actuator 22, itself comprising two armatures 223 and 224.

In the configuration described in FIG. 8, the coils 135 and 136 are symmetrically distributed on either side of the coil 134. The coil 135 is located between the coil 134 and the bulb 21. The coil 136 is located between the coil 134 and the bulb 11. The coils 134, 135 and 136 are made integral with the frame 10.

The armature 123 is located between the coils 134 and 136. The armature 124 is located between the coil 135 and the bulb 21. The armature 223 is located between the coils 134 and 135. The armature 224 is located between the coil 136 and the bulb 11.

The opening control-element is configured to simultaneously generate an opening current in the armatures 123 and 124 as well as an equivalent opening current in the armatures 223 and 224, so as to move the actuators 12 and 22 in opposite directions along the vertical orientation parallel to the A axis.

The coils 135 and 136 are connected to a capacitor or capacitive assembly (not shown) configured to generate an opening current in the coils 135 and 136. The opening-current peak thus flows through the coils 135 and 136, which then each generate an electromagnetic pulse.

The pulse generated in the coil 135 generates induced eddy currents in the armatures 124 and 223 whose electromagnetic field opposes that of the coil 135. Mechanical repulsive forces then occur between the energised coil 135 and the armatures 124 and 223, in orientations perpendicular to the surfaces 1242 and 2232 of the armatures 124 and 223 respectively.

The pulse generated in the coil 136 generates induced eddy currents in the armatures 123 and 224 whose electromagnetic field opposes that of the coil 136. Mechanical repulsive forces then occur between the energised coil 136 and the armatures 123 and 224, in orientations perpendicular to the surfaces 1232 and 2242 of the armatures 123 and 224 respectively.

These mechanical forces allow the actuators 12 and 22 to be accelerated sufficiently in the orientation parallel to the A axis to move the actuator 12 and actuator 22 in that orientation, in opposite directions of opening of the switches 111 and 211.

Figure 9:
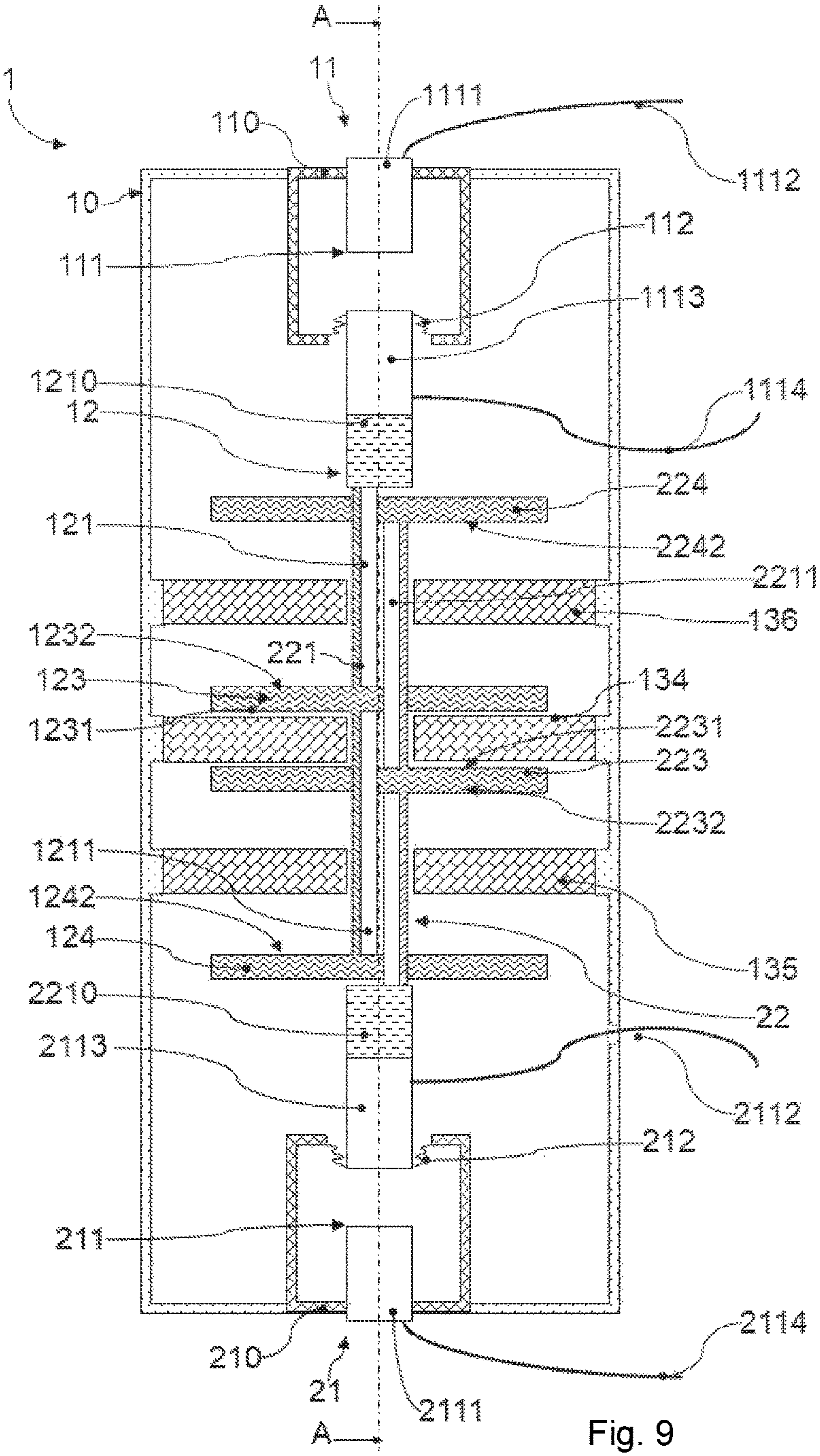
FIG. 9 shows a side sectional view of the variant of the circuit breaker of FIG. 8, in the open position.

FIG. 9 shows a side cross-sectional view of the vacuum-interrupter circuit breaker with inductive control 1, in the open position, achieved by generating an opening current in the coils 135 and 136 as detailed above.

According to an example of an embodiment of the invention, the coil 134 is connected to a capacitor or capacitive assembly (not shown) configured to generate a closing current in the coil 134. The closing-current peak thus flows through the coil 134 which then generates an electromagnetic pulse which generates induced eddy currents in the armature 123 and in the armature 223 whose electromagnetic field opposes that of the coil 134.

Magnetic repulsion forces then occur between the coil 134 and the armatures 123 and 223, in orientations perpendicular to the surfaces 1232 and 2232 of the armatures 123 and 223 respectively. These mechanical forces allow the actuators 12 and 22 to be accelerated sufficiently in the orientation parallel to the A axis to move the actuator 12 and actuator 22 in that orientation, in opposite directions of closing of the switches 111 and 211.

Figure 10:
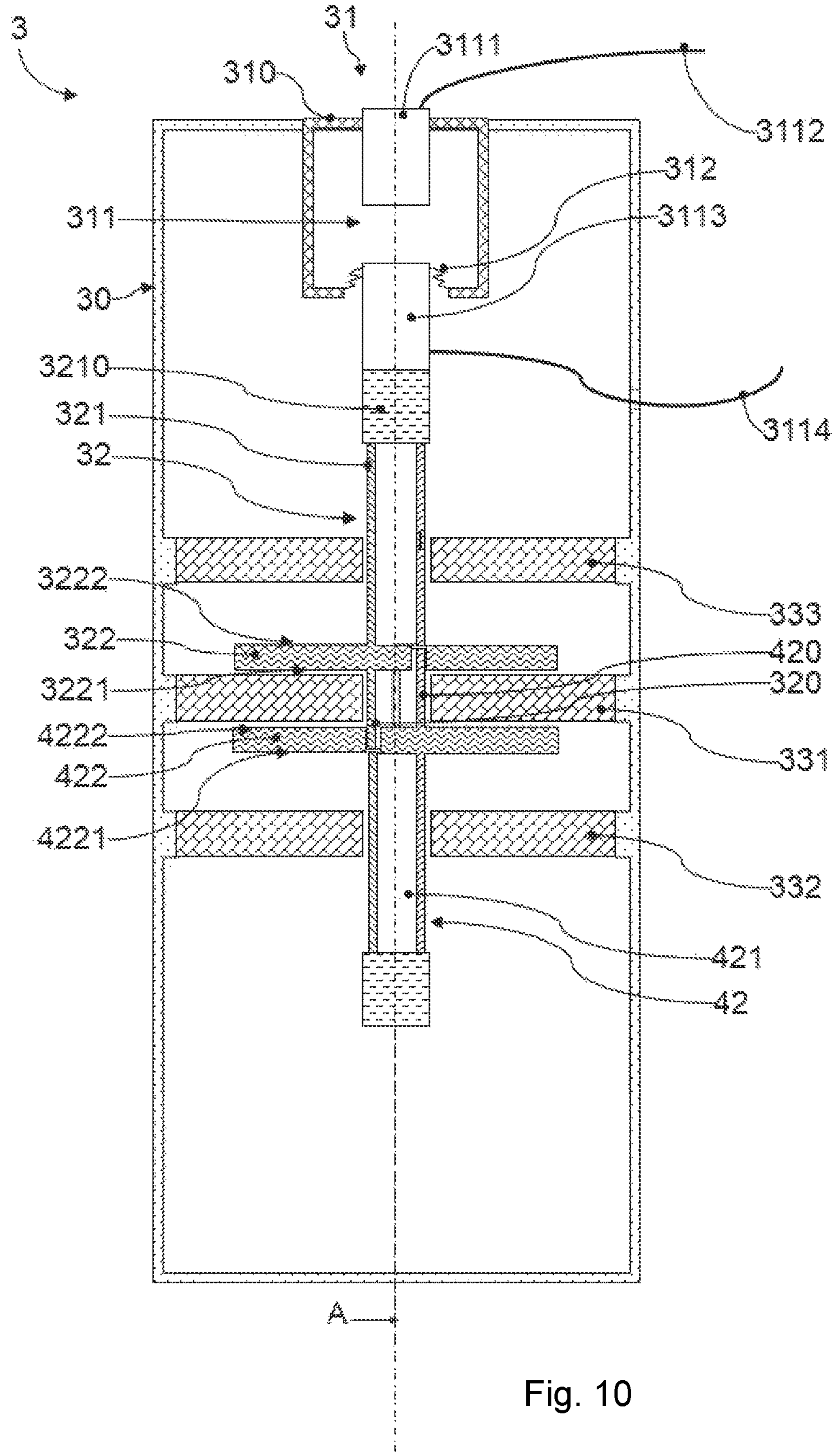
FIG. 10 shows a side sectional view of a vacuum-bulb contactor with inductive control according to one embodiment of the invention, in the open position.

FIG. 10 shows a side sectional view of an example of a vacuum-bulb contactor with inductive control 3 according to the invention, in the open position, having a frame 30 to which a vacuum bulb 31 is attached.

The vacuum bulb 31 has:

a chamber 310 with vacuum sealing, a switch 311 having a fixed electrode 3111 and a mobile electrode 3113. The electrodes 3111 and 3113 are aligned along an A axis. The electrodes 3111 and 3113 are housed in the vacuum chamber 310;

a bellows 312 allowing a translational movement of the mobile electrode 3113 along the A axis. The electrodes 3111 and 3113 can thus be brought into contact with each other (to close the switch) or separated from each other (to open the switch) while maintaining the vacuum sealing of the chamber 310.

The line current is supplied and removed by electrical connections 3112 and 3114 connected to electrodes 3111 and 3113 respectively.

The contactor 3 comprises an actuator 32 integral with the mobile electrode 3113. The actuator 32 is used to operate the mobile electrode 3113 to open or close the switch 311 of the contactor 3. The actuator 32 is slidably mounted in the vertical orientation parallel to the A axis. The actuator 32 comprises an armature 322.

The contactor 3 also comprises:

a closing control-element. The closing control-element has a coil 331;

a further actuator 42 slidably mounted in the vertical orientation parallel to the A axis. The actuator 42 comprises an armature 422. The coil 331 is positioned between the armature 322 and the armature 422.

The closing control-element is configured to simultaneously induce an opening current in the armature 322 and a current in the armature 422, so as to separate the electrodes 3111 and 3113 and so as to move the actuators 32 and 42 in opposite directions along the vertical orientation parallel to the A axis. To minimise the stresses on the frame created by the reaction forces, the two axes along which the movements of the actuators 32 and 42 take place are merged. The control-element thus makes it possible to close the circuit breaker 3 in a reduced time and to compensate for the reaction forces of the armature 322 on the coil 331 by the reaction forces of the armature 422 on the coil 331, as will be explained in detail below. Thus, compressive forces of the same magnitude are only applied to this coil 331, which reduces the size of its attachment to the frame 30. As a result of the compensation of these forces, the coil 331 undergoes less deformation and the air gap between the coil 331 and the armature 322 varies little over the life of the contactor 3. This ensures that the contactor 3 closes quickly, even after a large number of opening and closing operations. The vibrations generated when the contactor 3 is closed are also reduced.

Advantageously, the mobile mass integral with the actuator 42 is at least equal to half the mobile mass integral with the actuator 32, preferably equal to the mass of this actuator 32, in order to obtain optimal compensation of the reaction forces on the coil 331. The mobile mass attached to an actuator includes in particular the mass of the electrode in addition to that of the actuator itself.

The actuator 32 here comprises a rod 321. The rod 321 may have a dielectric material element 3210 to eliminate any risk of arcing between a control zone of the circuit breaker 3 and the mobile electrode 3113. The rod 321 also has one or more extensions 320, advantageously made of conductive material. The extension 320 here extends beyond the armature 322. The armature 322 is integral with the rod 3210. The dielectric element 3210 of the rod 321 is advantageously tubular in shape.

The armature 322 advantageously takes the form of a plate located between a planar coil 333 and the (here also planar) coil 331. The planar coil 333 belongs to an opening control-element of the contactor 3. The planar coil 333 is the opening coil. The coil 333 is therefore positioned opposite the armature 322 of the actuator 32, on the opposite side to the coil 331.

The armature 322 here has a lower conductive surface 3221 facing the coil 331 and an upper conductive surface 3222 facing the coil 333. The surfaces 3221 and 3222 may be formed in one piece in a solid plate or may be mounted on a plate-like support of a different material. The surfaces 3221 and 3222 are perpendicular to the A axis. Advantageously, the surfaces 3221 and 3222 are metallic. The material of the armature 322 may be selected for its high conductivity to density ratio; the armature material 322 may thus advantageously be aluminium. Advantageously, the armature surfaces 3221 and 3222 (as well as the coil 331) are axisymmetrical with respect to the A axis, so that force torques are compensated on the different elements of the armature 322.

A planar coil 332 is placed opposite the coil 333 symmetrically with respect to the coil 331. The coils 331, 332 and 333 are attached to the frame 30.

The actuator 42 also has a rod 421, advantageously tubular in shape, identical in shape to the rod 321.

The armature 422 here has an upper conducting surface 4221 facing the coil 331 and a lower conducting surface 4222 facing the coil 131. The surfaces 4221 and 4222 may be formed in one piece in a solid plate or may be mounted on a support. The surfaces 4221 and 4222 are perpendicular to the A axis. The surfaces 4221 and 4222 are metallic. The material of the armature 422 may be selected for its high conductivity to density ratio; the armature material 422 may thus advantageously be aluminium. The armature 422 is integral with the rod 4210.

The extension 320 of the actuator 32 passes through the armature 422 and the coil 331. The extension 420 of the actuator 42 passes through the armature 322 and the coil 331. This configuration allows the actuators 32 and 42 to guide each other in sliding in the orientation parallel to the A axis perpendicular to the surfaces 3221, 3222, 4221 and 4222.

The armature 322 is advantageously disc-shaped. The rod 321 may have a plurality of extensions 320 extending in the orientation parallel to the A axis perpendicular to the surface 3222 and to the surface 3221 around the A axis of the armature 322.

The armature 322 is pierced with orifices in which the extensions 420 of the rod 421 of the actuator 42 slide. There are advantageously as many orifices as there are extensions 420 of the rod 421 and the former are symmetrically distributed around the A axis.

According to an example of an embodiment of the invention, the coil 331 is connected to a capacitor or capacitive assembly (not shown) configured to generate a closing current in the coil 331. The opening-current peak thus flows through the coil 331 which then generates an electromagnetic pulse which generates induced eddy currents in the armature 322 and in the armature 422 whose electromagnetic field opposes that of the coil 331. Mechanical repulsive forces then occur between the energised coil 331 and the armatures 322 and 422.

Forces occur in orientations perpendicular to the surfaces 3221 and 3222 respectively. These forces allow the actuator 32 to be accelerated sufficiently in the orientation parallel to the A axis to move it in that orientation, in a closing direction. In a similar fashion, the actuator 42 is simultaneously moved in an opposite direction to the actuator 32.

When the extensions 320 and 420 are made of conductive material, a force appears in an orientation perpendicular to the A axis. This force is used to generate a magnetic centering of the actuator 32 and the actuator 42 with respect to the A axis.

Figure 11:
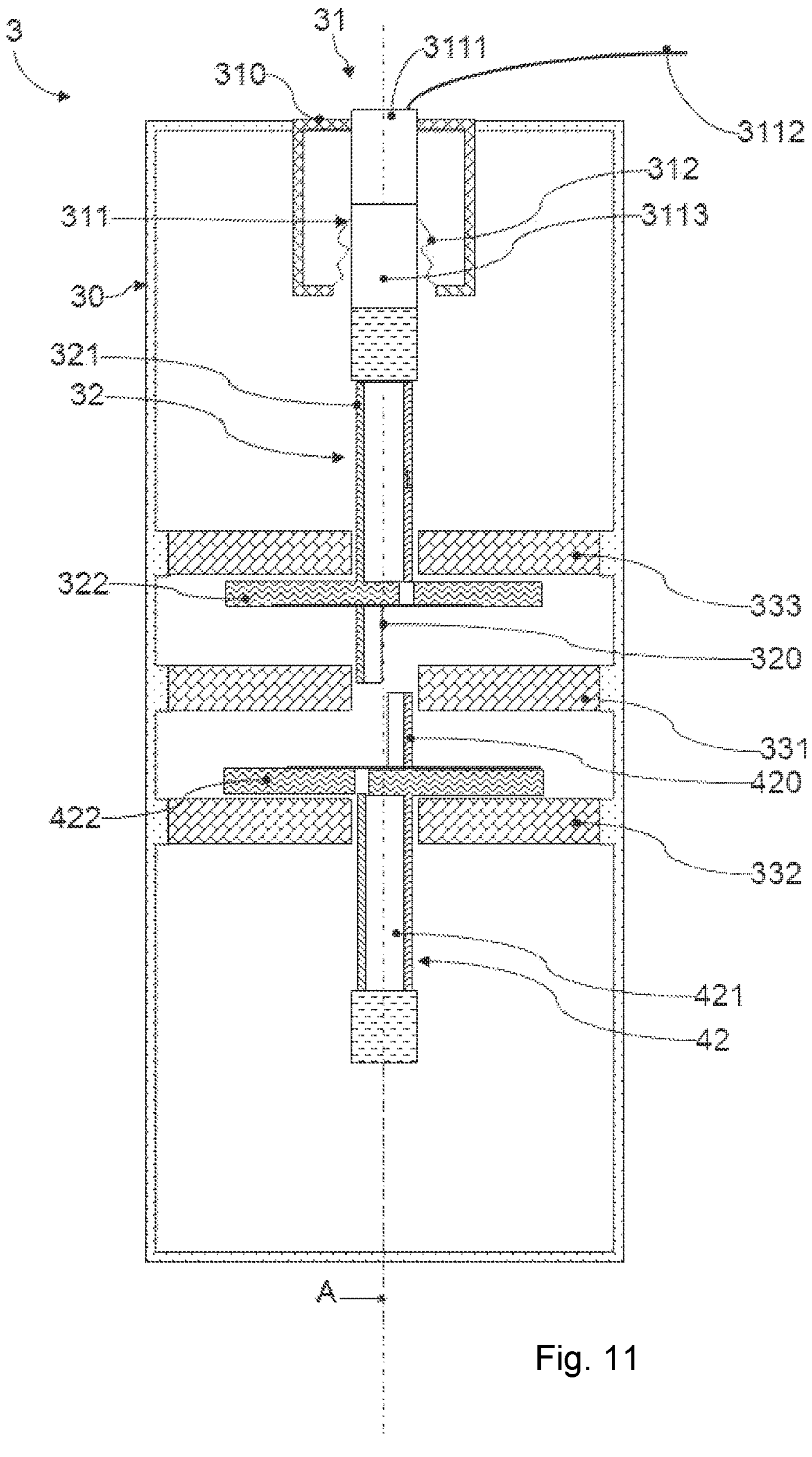
FIG. 11 shows a cross-sectional view of the vacuum-bulb contactor of FIG. 10, in the closed position.

When the switch 311 of the contactor 3 is in the closed state (the configuration shown in FIG. 11), a control-element may apply a current to the coil 333 (and similarly to the coil 332) to generate an opening current. The opening current thus flows through the coil 333 (and similarly through the coil 332) which then generates an electromagnetic pulse that generates induced eddy currents in the armature 322 (and similarly in the armature 422) whose electromagnetic field opposes that of the coil 333 (and similarly that of the coil 332). Mechanical repulsive forces then occur between the energised coil 333 and the armature 322 (similarly between the energised coil 332 and the armature 422).

Variations of the contactor 3 similar to those presented for the circuit breakers 1 can be envisaged: another switch operated by the actuator 42.

The invention claimed is:

1. A vacuum bulb switch (1) with inductive control, comprising:

a vacuum chamber (110);

a first switch (111) having first and second electrodes (1113, 1111) housed in the vacuum chamber and capable of being selectively brought into contact with or separated from each other, the first switch (111) further comprising a first actuator (12) mounted so as to slide in a first orientation (A) and integral with the first electrode (1113), the first actuator comprising a first armature (122); characterized in that it further comprises:

a second actuator (22) slidably mounted in the first orientation, the second actuator (22) having a second armature (222);

a first control-element having at least a first coil (131) positioned between the first armature (122) and the second armature (222) and configured to simultaneously generate a switching current in the first armature and a current in the second armature through said first coil (131), so as to separate or to put into contact the first and second electrodes (1113, 1111) and so as to move the first and second actuators in opposite directions along the first orientation.

2. The vacuum bulb switch (1) with inductive control according to claim 1, further comprising a second switch (211) having third and fourth electrodes (2113, 2111) housed in a vacuum chamber (210) and capable of being selectively brought into contact with or separated from each other, said second actuator (22) being integral with the third electrode (2113).

3. The vacuum bulb switch (1) with inductive control according to claim 2, wherein said first and third electrodes (1113, 2113) are electrically connected.

4. The vacuum bulb switch (1) with inductive control according to claim 1, wherein said switching current in the first coil (131) is an opening current so as to separate the first and second electrodes (1113, 1111).

5. The vacuum bulb switch (1) with inductive control according to claim 4, further comprising a second control-element having at least one second coil (132) positioned opposite the first armature (122) of the first actuator (12) and a third control-element having at least one third coil (133) positioned opposite the second armature (222) of the second actuator, said second and third control-elements being configured to simultaneously and respectively generate a current in the first armature and a current in the second armature via the second and third coils (132, 133), so as to move the first and second actuators (12, 22) in opposite directions along the first orientation and so as to put into contact the first and second electrodes (1113, 1111).

6. The vacuum bulb switch (1) with inductive control according to claim 5, wherein:

the first actuator (12) has a first arm (1211) integral with the first electrode (1113) and the first armature (122), the first armature (122) comprising at least a first orifice (123), the first coil (131) being positioned between the first armature (122) and the first electrode;

the second actuator (22) has a second arm (2211) integral with the third electrode (2113) and the second armature (222), the second armature having at least one second orifice, the first coil (131) being positioned between the second armature and the third electrode, the second arm passing through the first orifice and the first arm passing through the second orifice.

7. The vacuum bulb switch (1) with inductive control according to claim 6, in which the first armature (122) has several orifices (123) distributed around an axis (A) and the first actuator (12) has several arms integral with the first electrode and the first armature and distributed around said axis and in which the second armature (222) has several orifices distributed around said axis and the second actuator has several arms integral with the second electrode and the second armature and distributed around said axis, the arms of the first actuator passing through the orifices of the second armature and the arms of the second actuator passing through the orifices of the first armature.

8. The vacuum bulb switch (1) with inductive control according to claim 1, wherein the first and second actuators (12, 22) guide each other slidably along the first orientation.

9. The vacuum bulb switch (3) with inductive control according to claim 1, wherein said switching current in the first coil (331) is a closing current so as to put into contact the first and second electrodes (3113, 3111).

10. The vacuum bulb switch (1) with inductive control according to claim 1, wherein the first armature (122) and the second armature (222) each include a disc-shaped metal plate perpendicular to the first orientation.

11. The vacuum bulb switch (1) with inductive control according to claim 1, wherein a mobile mass integral with the second actuator (22) is at least equal to half a mobile mass integral with the first actuator (12).

12. The vacuum bulb switch (1) with inductive control according to claim 1, wherein:

the first actuator (12) has a third armature (124);

the second actuator (22) has a fourth armature (224);

said first control-element has at least a fourth coil (135) positioned between the third and fourth armatures, said first control-element being configured to simultaneously generate a current in the third armature (124) and a current in the fourth armature (224) through said fourth coil (135) so as to separate or to put into contact the first and second electrodes and so as to move the first and second actuators (12, 22) in opposite directions along the first orientation.

13. The vacuum bulb switch (1) with inductive control according to claim 1, wherein the first control-element comprises a capacitor configured to discharge into the first coil (131) upon simultaneous generation of currents in the first and second armatures.

14. The vacuum bulb switch (1) with inductive control according to claim 1, wherein the first actuator (12) includes an element of electrically insulating material (1210) separating the first electrode from the first armature (122).

15. The vacuum bulb switch (1) with inductive control according to claim 1, wherein the first actuator (12) has a metal portion (1211) being encircled by the first coil (131).

* * * * *